United States Patent Office 3,313,819
Patented Apr. 11, 1967

3,313,819
9 - SPIRO - (1' - SUBSTITUTED PIPERIDYL - 4') - 4 SUBSTITUTED - 1,4,8 - TRIAZABICYCLO [5,3,0] DECANE-$\Delta^{7,8}$-10-ONES
Rudolf G. Griot, Florham Park, N.J., assignor to Sandoz Inc., Hanover, N.J.
No Drawing. Filed May 27, 1964, Ser. No. 370,679
9 Claims. (Cl. 260—294)

The subject application is a continuation-in-part of application Ser. No. 354,431, filed on Mar. 24, 1964.

This invention is directed to spirotetrazo compounds of the formula

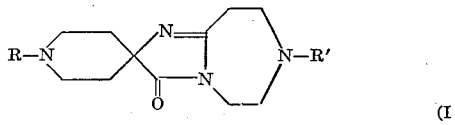

wherein each of R and R' is either a hydrogen atom (—H) or lower alkyl, e.g. methyl, ethyl, isopropyl, butyl and amyl. These compounds are prepared according to reactions (A) to (D):

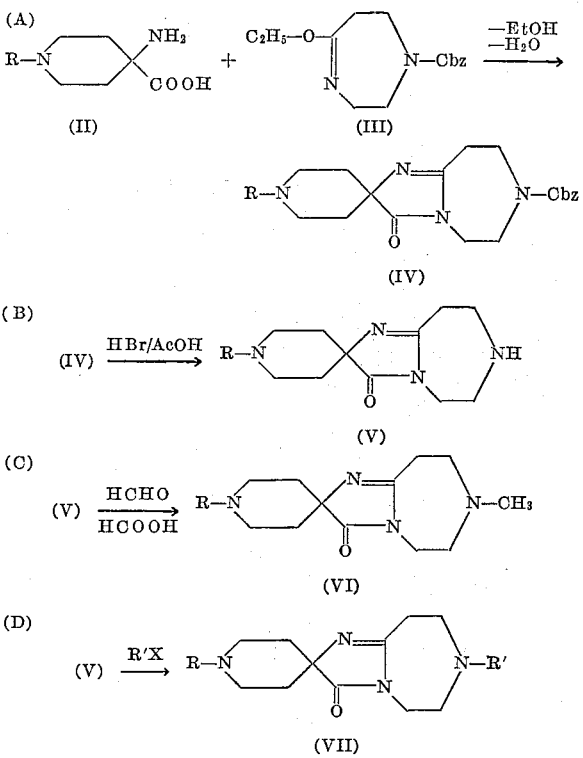

wherein
Cbz is carbobenzoxy;
Et is ethyl;
AcOH is acetic acid;
X is either chlorine or bromine; and
each of R and R' has its above-defined meaning, except: in reactions (C) and (D) both R and R' are lower alkyl. In reaction (C) a hydrogen atom as R in compound (V) is converted to a methyl group as R in compound (VI). In reaction (D) a hydrogen atom as R in compound (V) is converted to R' (instead of R) in compound (VII).

If it is desired to produce a compound wherein R is a hydrogen atom and R' is lower alkyl, the R-position is protected, as by a carbobenzoxy group, during the alkylation (D). Thereafter the carbobenzoxy group is removed according to reaction (B).

Compounds (I) are tranquilizers and blood pressure reducing agents. They are administered orally or parenterally in daily doses from 200 milligrams to 400 milligrams. All acid addition salts of (I) are intermediates from which (I) may be freed.

In the examples which follow, the parts and percentages are by weight unless otherwise specified, and the temperatures are in degrees centigrade. The relationship between parts by weight and parts by volume is the same as that between the kilogram and the liter.

EXAMPLE 1

4-amino-4-carboxy-1-methyl-piperidine

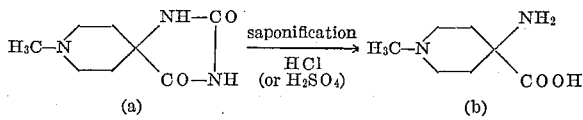

Reflux 22 parts of 8-methyl-1,3,8-triazaspiro [4,5]decane-2,4-dione [Mailey, Everett A., and Day, Allan R., J. Organic Chemistry, 22, 1061 (1957)] in 125 parts by volume of 60 percent sulfuric acid for twenty-four hours (oilbath 160°; reaction mixture at about 130°). Cool the resulting clear solution to 20°, and thereafter dilute same with 250 parts by volume of water. Pass the thusdiluted solution slowly through a column (twice the volume of the water of dilution) of Dowex 50W-X-8.

Rinse the ion exchanger sequentially with 1000 parts by volume of water and with 1000 parts by volume of methanol. Thereafter elute the amino acid from the ion exchanger with 6000 parts by volume of a 5 percent solution of ammonio (NH$_3$) in methanol.

Evaporate the eluate to dryness. There are thus obtained 13 parts of crystalline title compound, melting point (M.P.) 286° (decomp.).

EXAMPLE 2

8-carbobenzoxy-1,3,8-triazaspiro[4,5]decane-2,4-dione

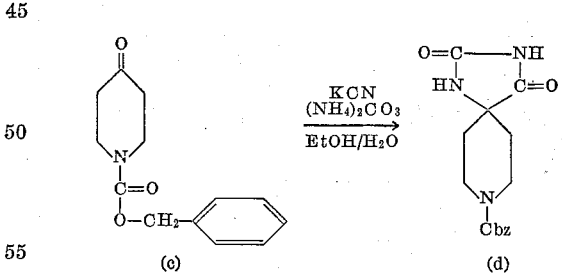

Heat an aqueous ethanol solution of 1-carbobenzoxy-4-piperidone (c) [boiling point (B.P) 100°/0.05 millimeters (mm.); $\mu_D^{20}$=1.536], ammonium carbonate and potassium cyanide according to the procedure described by Mailey and Day, J. Organic Chemistry, 22, 1061 (1957), and separate the title spirohydantoin (D) accordingly from the resulting reaction mixture.

8 - benzyl - 1,3,8 - triazaspiro[4,5]decane - 2,4 - dione (f) is prepared from 1-benzyl-4-piperidone (e) according to the same procedure.

EXAMPLE 3

*1-carbobenzoxy-4-amino-4-carboxy-piperidine*

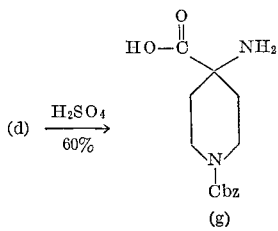

Admix (d) with a 60 percent aqueous sulfuric acid solution and saponify the former. The title compound (g) is thus obtained. Isolate (g) by passing the saponification product through Dowex 50W–X–8.

1-benzyl-4-amino-4-carboxy-piperidine (h) is prepared from (f), and 4-amino-4-carboxy-piperidine (j) is prepared from 1,3-8-triazaspiro[4,5]decane-2,4-dione (i) according to the this procedure.

EXAMPLE 4

*4-amino-4-carboxy-piperidine*

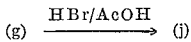

Dissolve (g) in a minimum amount of acetic acid (AcOH). Admix with the resulting solution an excess of hydrogen bromide (in 4 N AcOH) at room temperature for four hours. The dihydrobromide of the title compound (j) is thus obtained. The free base is prepared conventionally therefrom.

Compound (i) is prepared from (f), and compound (j) is prepared from (h) according to the procedure of this example.

The carbobenzoxy group of compound (g) is alternatively removed by hydrogenolytic cleavage with platinum oxide (PtO$_2$) catalyst in AcOH.

EXAMPLE 5

*9-spiro-(1'-methylpiperidyl-4')-4-carbobenzoxy-1,4,8-triazabicyclo[5,3,0]decen-$\Delta^{7,8}$-10-one*

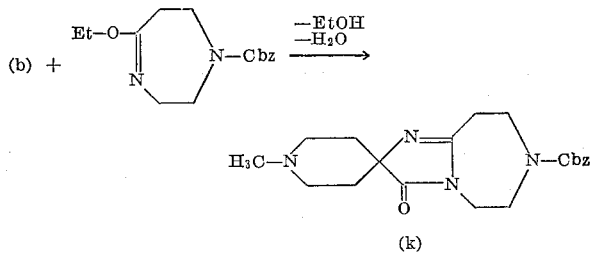

Reflux 0.790 part (5 moles) of (b) and 1.38 parts (5 moles) of 1-carbobenzoxy-5-ethoxy-1,4-diazacycloheptene-$\Delta^{4,5}$ (III) for twenty-four hours in 50 parts by volume of methanol. Evaporate the solvent from the reaction product (k). Recrystallize the title compound (k), M.P. 132° to 133°, from ethyl acetate. A yield of 45 percent, based on the starting weight of (b), is thus obtained.

EXAMPLE 6

*9-spiro-(1'-methylpiperidyl-4')-1,4,8-triazabicyclo[5,3,0]decen-$\Delta^{7,8}$-10-one*

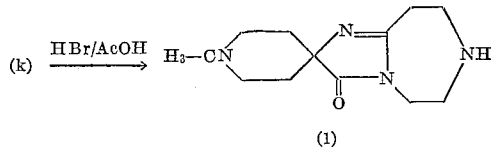

Dissolve 0.630 part (1.7 moles) of (k) in 5 parts by volume of concentrated acetic acid. At 20° admix with the resulting solution for 4 hours 20 parts by volume of a 27 percent solution of hydrogen bromide in concentrated acetic acid. Filter the thus-formed crystalline precipitate. Dry said precipitate, M.P. 305° to 306° (dec.), in a high vacuum. This precipitate (0.450 part) is the trihydrobromide of the title compound (1) and is very hygroscopic.

The free base (1), M.P. 80.5° to 82.5°, is prepared according to known procedures from the trihydrobromide, i.e. by admixture with one and a half equivalents of potassium carbonate. All acid addition salts (according to this invention), e.g. the dimaleinate of (1), M.P. 165° to 166°, are similarly converted into their corresponding free bases.

EXAMPLE 7

*9-spiro-(1'-methylpiperidyl-4')-4-methyl-1,4,8-triazabicyclo[5,3,0]decen-$\Delta^{7,8}$-10-one*

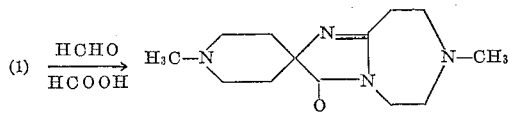

Dissolve 8.2 part sof (1) in 6 parts of 90 percent formic acid, and admix the resulting solution with 4.05 parts of 36 percent (aq.) formaldehyde (Eschweiler-Clarke procedure). Maintain the product on a boiling-water bath for four hours. Thereafter add an excess of 2 N hydrochloric acid to the resultant, and then evaporate in vacuo to dryness.

Add sufficient aqueous potassium carbonate to the residue to make same alkaline, and extract the thus-produced base with chloroform. Evaporate the solvent from the chloroform extract.

To prepare the trimethanesulfonate, M.P. 224° to 225°, of the title compound, admix the residue from the chloroform extract with a methanolic solution of methanesulfonic acid (three moles of methanesulfonic acid per mole of title compound). Add diethylether to the resultant to crystallize the trimethanesulfonate, which is hygroscopic. Recrystallize said trimethanesulfonate from methanol/diethylether.

To prepare the dimaleinate, M.P. 98° to 100°, of the title compound, admix the residue from the chloroform extract with a methanolic solution of maleic acid (two moles of maleic acid per mole of title compound). Add diethylether to the resultant to crystallize the dimaleinate, which is hygroscopic. Recrystallize said dimaleinate from methanol/diethylether.

What is claimed is:

1. A member selected from the group consisting of a compound of the formula

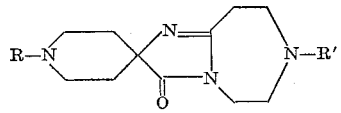

wherein each of R and R' is a member selected from the group consisting of a hydrogen atom and lower alkyl, and acid addition salts thereof.

2. A compound of the formula

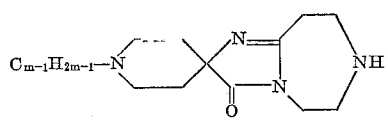

wherein $m$ is a positive whole number of at most 6.

3. A compound of the formula

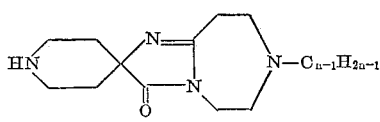

wherein $n$ is a positive whole number of at most 6.

4. 9 - spiro - (1'-methylpiperidyl-4')-4-carbobenzoxy-1,4,8-triazabicyclo[5,3,0]decen-$\Delta^{7,8}$-10-one.

5. 9 - spiro-(piperidyl-4')-4-carbobenzoxy-1,4,8-triazabicyclo[5,3,0]decen-$\Delta^{7,8}$-10-one.

6. 9 - spiro-(1'-methylpiperidyl-4')-1,4,8-triazabicyclo[5,3,0]decen-$\Delta^{7,8}$-10-one.

7. 9 - spiro - (piperidyl-4')-1,4,8-triazabicyclo[5,3,0]decen-$\Delta^{7,8}$-10-one.

8. 9 - spiro - (1'-methylpiperidyl-4')-4-methyl-1,4,8-triazabicyclo[5,3,0]decen-$\Delta^{7,8}$-10-one.

9. 9 - spiro - (piperidyl-4')-4-methyl-1,4,8-triazabicyclo[5,3,0]decen-$\Delta^{7,8}$-10-one.

No references cited.

WALTER A. MODANCE, *Primary Examiner.*

A. D. SPEVACK, *Assistant Examiner.*